(12) United States Patent
Hsu et al.

(10) Patent No.: US 9,384,307 B2
(45) Date of Patent: *Jul. 5, 2016

(54) STITCH AND TRIM METHODS FOR DOUBLE PATTERNING COMPLIANT STANDARD CELL DESIGN

(71) Applicant: Taiwan Semiconductor Manufacturing Co., Ltd., Hsin-Chu (TW)

(72) Inventors: Chin-Hsiung Hsu, Guanyin Township (TW); Huang-Yu Chen, Zhudong Township (TW); Chung-Hsing Wang, Baoshan Township (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/970,636

(22) Filed: Aug. 20, 2013

(65) Prior Publication Data

US 2013/0339911 A1 Dec. 19, 2013

Related U.S. Application Data

(63) Continuation of application No. 13/415,997, filed on Mar. 9, 2012, now Pat. No. 8,539,396.

(60) Provisional application No. 61/581,671, filed on Dec. 30, 2011.

(51) Int. Cl.
G06F 17/50 (2006.01)

(52) U.S. Cl.
CPC ............ *G06F 17/50* (2013.01); *G06F 17/5072* (2013.01); *G06F 2217/78* (2013.01)

(58) Field of Classification Search
CPC .. G06F 17/50; G06F 17/5072; G06F 2217/78
USPC ...................... 716/50–56; 430/5, 30
See application file for complete search history.

(56) References Cited

U.S. PATENT DOCUMENTS

| 8,136,072 B2* | 3/2012 | Frederick ...................... 716/119 |
| 2008/0244503 A1 | 10/2008 | Graur et al. |
| 2010/0196803 A1 | 8/2010 | Lu et al. |
| 2011/0003254 A1 | 1/2011 | Chang et al. |
| 2011/0004858 A1 | 1/2011 | Chang et al. |
| 2011/0078638 A1 | 3/2011 | Kahng et al. |
| 2011/0193234 A1 | 8/2011 | Chen et al. |
| 2011/0296360 A1 | 12/2011 | Wang et al. |
| 2012/0196230 A1 | 8/2012 | Cho et al. |
| 2012/0256298 A1 | 10/2012 | Fu et al. |
| 2013/0007674 A1 | 1/2013 | Abou Ghaida et al. |
| 2013/0074029 A1* | 3/2013 | Blatchford ................... 716/127 |

OTHER PUBLICATIONS

"Decomposition-Aware Standard Cell Design Flows to Enable Double-Patterning Technology" by Lars Liebmann, David Pietromonaco, Matthe Graf, IBM, @2011 SPIE.*
Ban, Y. et al., "Flexible 2D Layout Decomposition Framework for Spacer-Type Double Patterning Lithography", DAC11, Jun. 5-10, 2011, pp. 789-794.
Liebmann, L., et al., "Decomposition-Aware Standard Cell Design Flows to Enable Double-Patterning Technology", Proc. of SPIE, 2011, 7974, pp. 1-12.

* cited by examiner

*Primary Examiner* — Nha Nguyen
(74) *Attorney, Agent, or Firm* — Duane Morris LLP; Steven E. Koffs

(57) ABSTRACT

A method for creating double patterning compliant integrated circuit layouts is disclosed. The method allows patterns to be assigned to different masks and stitched together during lithography. The method also allows portions of the pattern to be removed after the process.

20 Claims, 17 Drawing Sheets

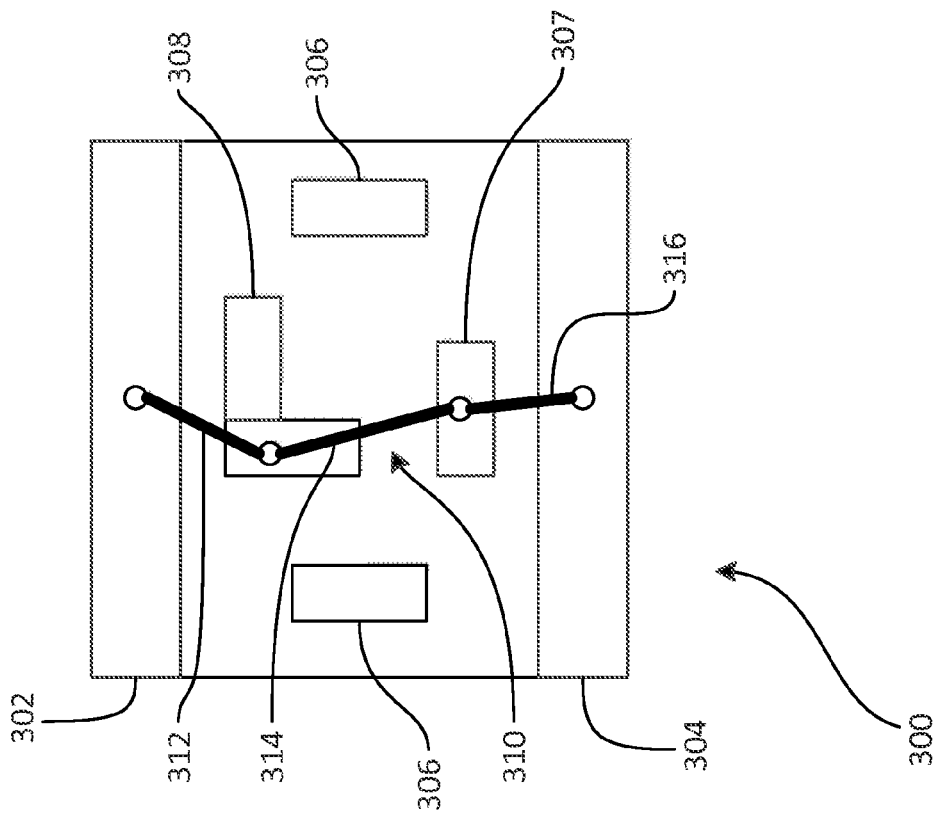
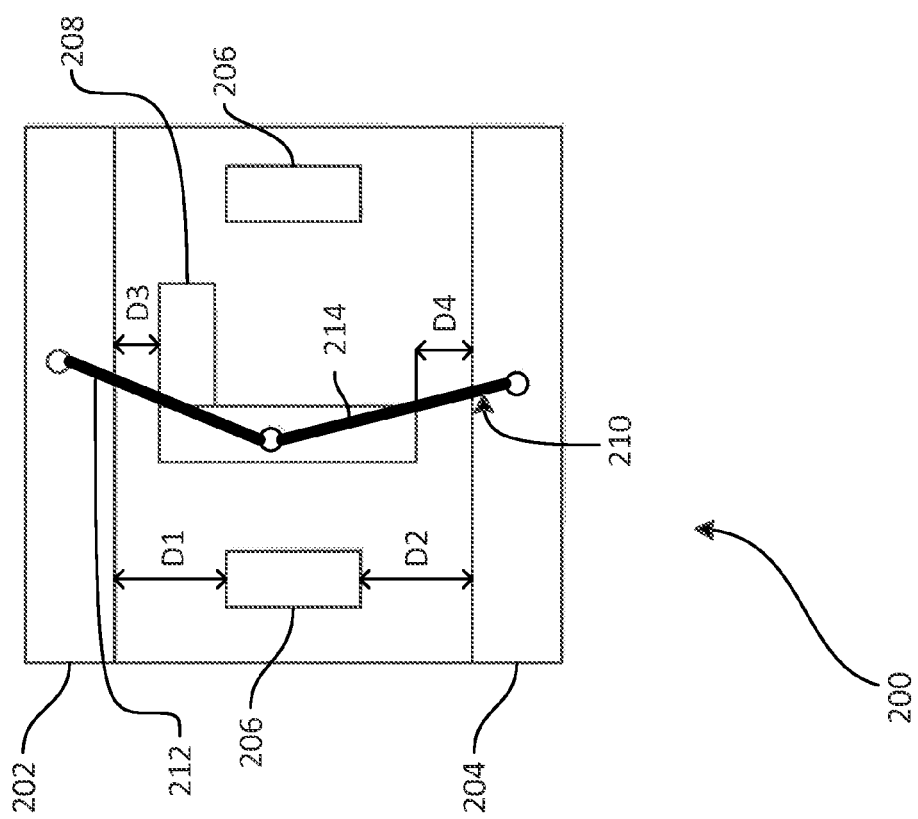
FIGURE 3
FIGURE 2

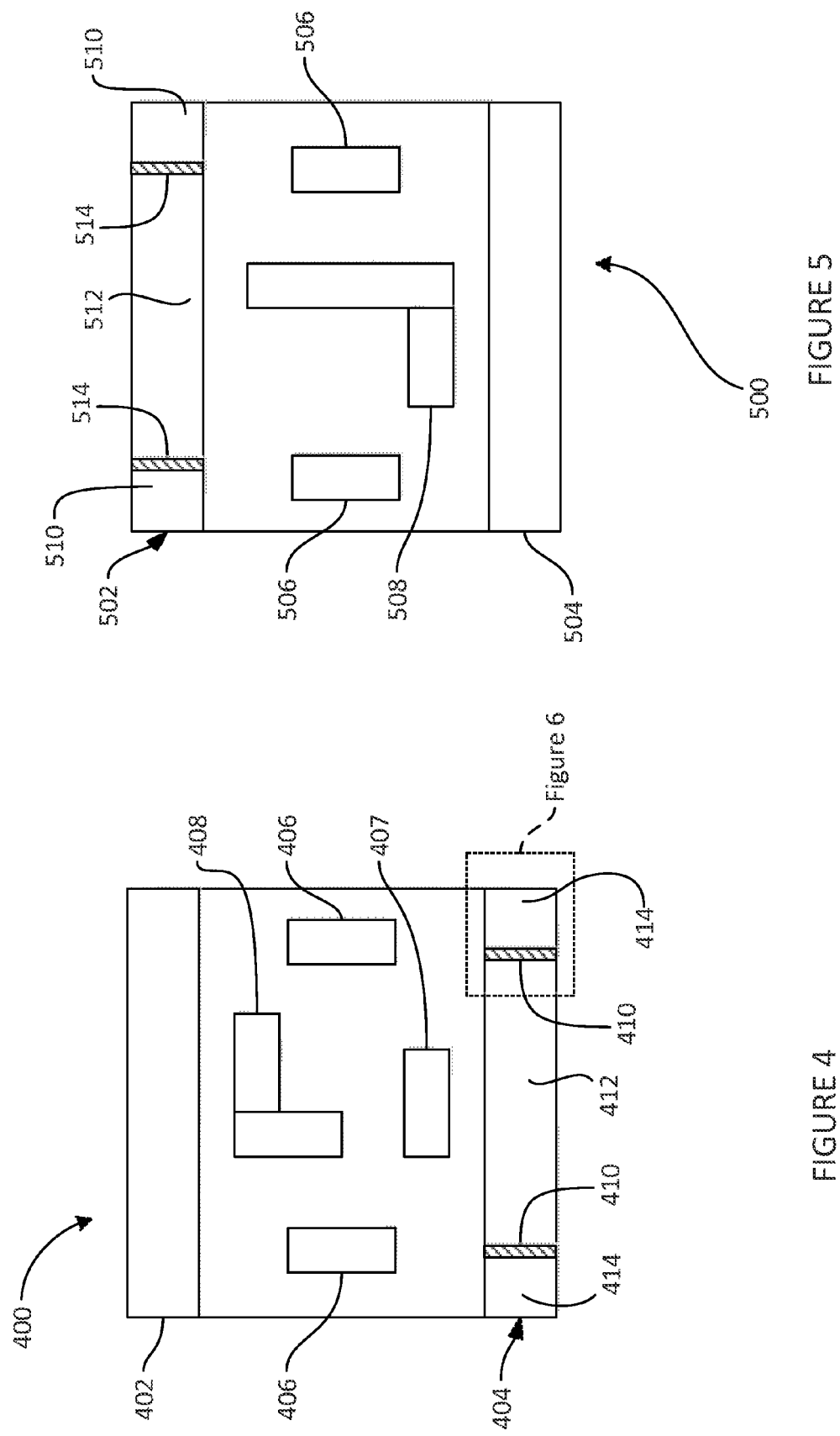

STITCH AND TRIM METHODS FOR DOUBLE PATTERNING COMPLIANT STANDARD CELL DESIGN

This application is a continuation application of and claims priority to U.S. patent application Ser. No. 13/415,997, filed Mar. 9, 2012, which claims the benefit of U.S. Provisional Patent Application No. 61/581,671, filed Dec. 30, 2011, both of which both are expressly incorporated by reference herein in their entirety.

FIELD OF DISCLOSURE

The present disclosure relates to semiconductor fabrication generally, and specifically to electronic design automation tools and methods.

BACKGROUND

In semiconductor fabrication processes, the resolution of a photoresist pattern begins to blur at about 45 nanometer (nm) half pitch. To continue to use fabrication equipment purchased for larger technology nodes, double exposure methods have been developed.

Double exposure involves forming patterns on a single layer of a substrate using two different masks in succession. As a result, a minimum line spacing in the combined pattern can be reduced while maintaining good resolution. One form of double exposure is referred to as double patterning technology (DPT). DPT is a layout splitting method analogous to a two coloring problem for layout splitting in graph theory. The layout polygon and critical space are similar to the vertex and edge of the graph respectively. Two adjacent vertices connected with an edge should be assigned different colors. In double patterning, two "color types" are assigned. Each pattern on the layer is assigned a first or second "color"; the patterns of the first color are formed by a first mask, and the patterns of the second color are formed by a second mask. A graph is typically considered 2-colorable only if it contains no odd-cycle and loop. Although DPT has advantages, it is computationally intensive.

A final Integrated Circuit (IC) layout may be made from a plurality of smaller cell layouts. These cells may be retrieved from a cell library and may be DPT compliant with patterns distributed between multiple masks. When multiple cells are combined, it is possible to join the cells in a way that does not yield a double patterning decomposable layout.

BRIEF DESCRIPTION OF THE DRAWINGS

FIG. 2 shows an even path cell that is double patterning compliant.

FIG. 3 shows an even path cell in which an even path design rule is violated by the presence of an odd path.

FIG. 4 shows an odd path cell with two stitches on the Vss pattern.

FIG. 5 shows an even path cell with two stitches on the Vdd pattern.

DETAILED DESCRIPTION

Figure 1:
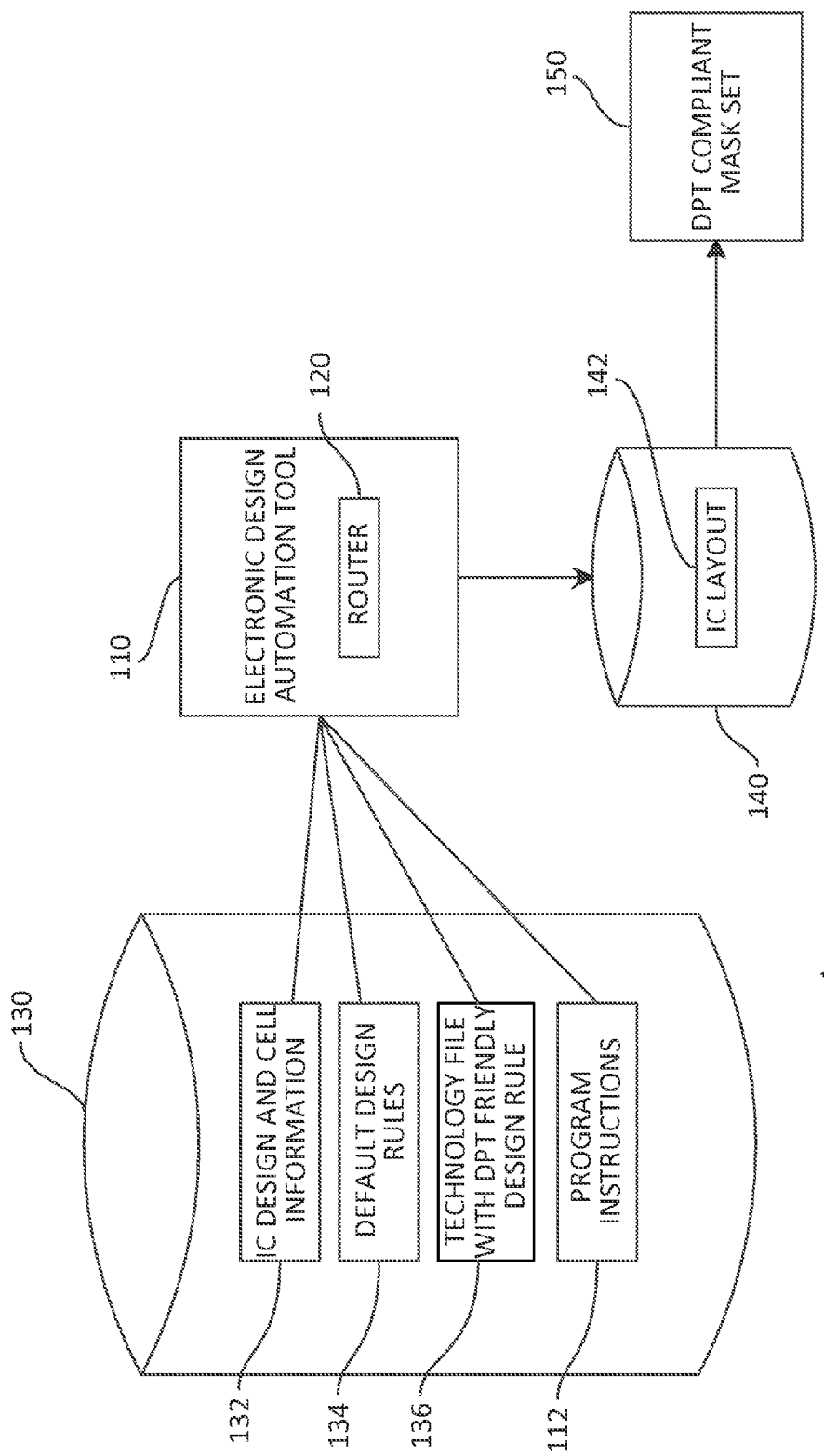
FIG. 1 is a block diagram of a system according to one embodiment.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

FIG. 1 shows a system 100 having an electronic design automation (EDA) tool 110 such as "IC COMPILER"™, sold by Synopsys, Inc. of Mountain View, Calif., including a router 120 such as "ZROUTE"™, also sold by Synopsys. Other EDA tools 110 may be used, such as the "VIRTUOSO" custom design platform or the Cadence "ENCOUNTER"® digital IC design platform may be used, along with the "VIRTUOSO" chip assembly router 120, all sold by Cadence Design Systems, Inc. of San Jose, Calif. The EDA tool 110 is a special purpose computer formed by retrieving stored program instructions 112 from a computer readable storage medium 130 and executing the instructions on a general purpose processor.

One or more persistent computer readable storage media 130 are provided to store input data used by the EDA tool 110. The storage medium 130 may include one or more of dynamic random access memory (DRAM), SRAM, a read only memory (ROM), EEPROM, a hard disk drive (HDD), an optical disk drive (CD-ROM, DVD-ROM or BD-ROM), or a flash memory, or the like. The router 120 is capable of receiving an identification of a plurality of cells to be included in an integrated circuit (IC) layout, including a list 132 of pairs of cells within the plurality of cells to be connected to each other.

The router may be equipped with a set of default design rules 134, which may be used for larger technology nodes (e.g., 90 nm), which can be patterned clearly using a single mask, without DDL or DPT.

According to some embodiments, an additional set of rules 136 is provided to facilitate generation of DPT friendly patterns. The additional rules 136 may be inputted to the router in the form of a technology file, for example. The "DPT friendly" design rules are adapted for use in smaller technologies which use double exposure techniques. The term "DPT friendly" refers to patterns which are capable of being decomposed for DPT, so that each of the two masks used to pattern a single layer can perform an exposure with high resolution.

For example, in some embodiments, the design rules 136 further configure the router 120 for locating connecting lines and vias exclusively on a manufacturing grid.

A computer readable storage medium 140 is provided, for outputting an IC layout 142. The medium 140 may be a separate storage device, or a portion of the same storage medium 130 described above. The medium 140 may be any of the types of storage media described above with respect to medium 130.

The IC layout 142 is then usable for generating DPT compliant mask sets 150, which may include two masks for any double patterned layer.

Referring now to FIG. 2, DPT compliant cell 200 is shown. Two sets of patterns are distributed between a first mask and a second mask. In the discussed embodiments and the corresponding figures, patterns assigned to the first mask are represented as a dark color, and patterns assigned to the second mask are represented by a light color. For example, patterns 206 are assigned to a first mask (e.g., dark colored mask) and pattern 208 is assigned to a second mask (e.g., light colored mask). Additionally, Vdd pattern 202 and Vss pattern are each assigned to the first mask. In this specification, the terms "dark," "light," "first mask," and "second mask" are used to distinguish which patterns are associated with which masks.

Distributing the patterns across two masks may prevent minimum spacing violations. DPT involves forming patterns on a single layer of a substrate using two different masks in succession. As a result, a minimum line spacing can be maintained within each mask, to establish good resolution, even though the final double-exposed layer has one or more pairs of patterns separated by a spacing smaller than the minimum line spacing. If a single mask is assigned two patterns that are too close together, the lines drawn on the substrate may blur. By placing the patterns on different masks, however, the lithography process is able to draw defined lines very close together. In FIG. 2, for example, if pattern 208 were assigned to the first mask it would violate an even path design rule, and pattern 208 may not be formed clearly on the substrate due to its proximity to Vdd and Vss patterns 202 and 204. The spacings D3 and/or D4 are less than the minimum line spacing for a single mask. To alleviate this concern, pattern 208 is assigned to a separate mask from Vdd and Vss patterns 202 and 204. Patterns 206, in contrast, may be sufficiently distant from the other patterns assigned to the first mask that the resolution impact is non-existent or negligible. Pattern 206 is separated from Vdd 202 by a spacing D1, and from Vss 204 by a spacing D2. Thus, patterns 206 do not violate the minimum spacing restrictions, even when assigned to the same mask as Vdd and Vss. Minimum spacing constraints may be defined by a user or system 100, and may vary based on the type of equipment used during lithography.

FIG. 2 is considered, for the purposes of this disclosure, an even path cell. Because the Vdd bus 202 and Vss bus 204 are assigned the same color, a set of patterns separated by spaces smaller than the minimum separation distance is two-colorable if each path from Vdd to Vss has an even number of segments. For example, path 210 comprises segments 212, 214 where each segment spans a space that would, if all the patterns were assigned to the same mask, violate a minimum spacing constraint. In FIGS. 2-3 and 14-15, paths shown by solid thick lines indicate that the traversed spaces between the patterns are smaller than a minimum spacing constraint. In the remaining drawings, no assumption regarding minimum spacing violations is to be made. In FIG. 2, the path 210 is two segments long and therefore has an even number of path spacings D3, D4 that are smaller than the minimum single-mask spacing constraint. Because the path has an even number of segments, cell 200 is considered DPT compliant as an even path cell. Cells may also be odd path or mixed path, as will be discussed further below.

Additionally, FIG. 2 may be considered DPT compliant because it is possible to assign the patterns 206, 208 to the first and second colors such that none of the segments 212, 214 connect patterns of the same color. All of the pairs of adjacent patterns which are positioned close enough to violate a minimum single-mask spacing constraint are therefore assigned to different masks from each other.

In contrast, FIG. 3 depicts a cell which is not DPT compliant because there is an even path design rule violation (corresponding to patterns 307 and 316 being too close for assignment to the same mask as each other). Like FIG. 2, cell 300 has two sets of patterns assigned to a first mask and a second mask. Specifically, Vdd pattern 302, Vss pattern 304, and patterns 306 and 307 are all assigned to a first mask. Pattern 308 is assigned to the second mask. The cell is designated an even path cell because the Vdd bus 302 and Vss bus 304 are the same color. Thus, a set of patterns for which each path from Vdd bus 302 to Vss bus 304 has an even number of spacings smaller than the minimum separation is two-colorable. Cell 300 is not DPT compliant, however, because the path 310 from Vdd to Vss has an odd number of spacings that are smaller than the minimum single-mask separation. There is no way to assign the patterns 307 and 308 to the two masks without having two of the patterns on the same mask separated by a spacing smaller than the minimum separation.

Patterns 307 and Vss 304 are both shown assigned to the first mask and are positioned too close together. Reassigning pattern 307 to the second mask (along with pattern 308) may resolve the spacing conflict identified by segment 316, but it would introduce a new violation between patterns 307 and 308. This new violation would be identified by segment 314.

In some embodiments, some cells are designed to be odd path cells. For example, Vss bus 304 may be assigned to a different mask than the Vdd bus 302. For an odd path cell, a set of patterns for which each path from Vdd bus 302 to Vss bus 304 has an odd number of spacings smaller than the minimum separation is two-colorable.

Alternatively, to avoid stitching Vdd bus 302 or Vss bus 304, designers may adopt a convention to only abut even path cells with other even path cells, or odd path cells with other odd path cells.

In other embodiments a single layout may include both even path cells and odd path cells. If an even path cell is abutted to an odd path cell, one of the Vdd bus 302 or Vss bus 304 has respective portions in two adjacent cells assigned to respectively different masks. A stitching technique may be used to provide a continuous bus pattern from segments on two different masks. FIGS. 4-12 disclose a method to allow IC designs having abutments between even and odd path cells.

Figure 8:
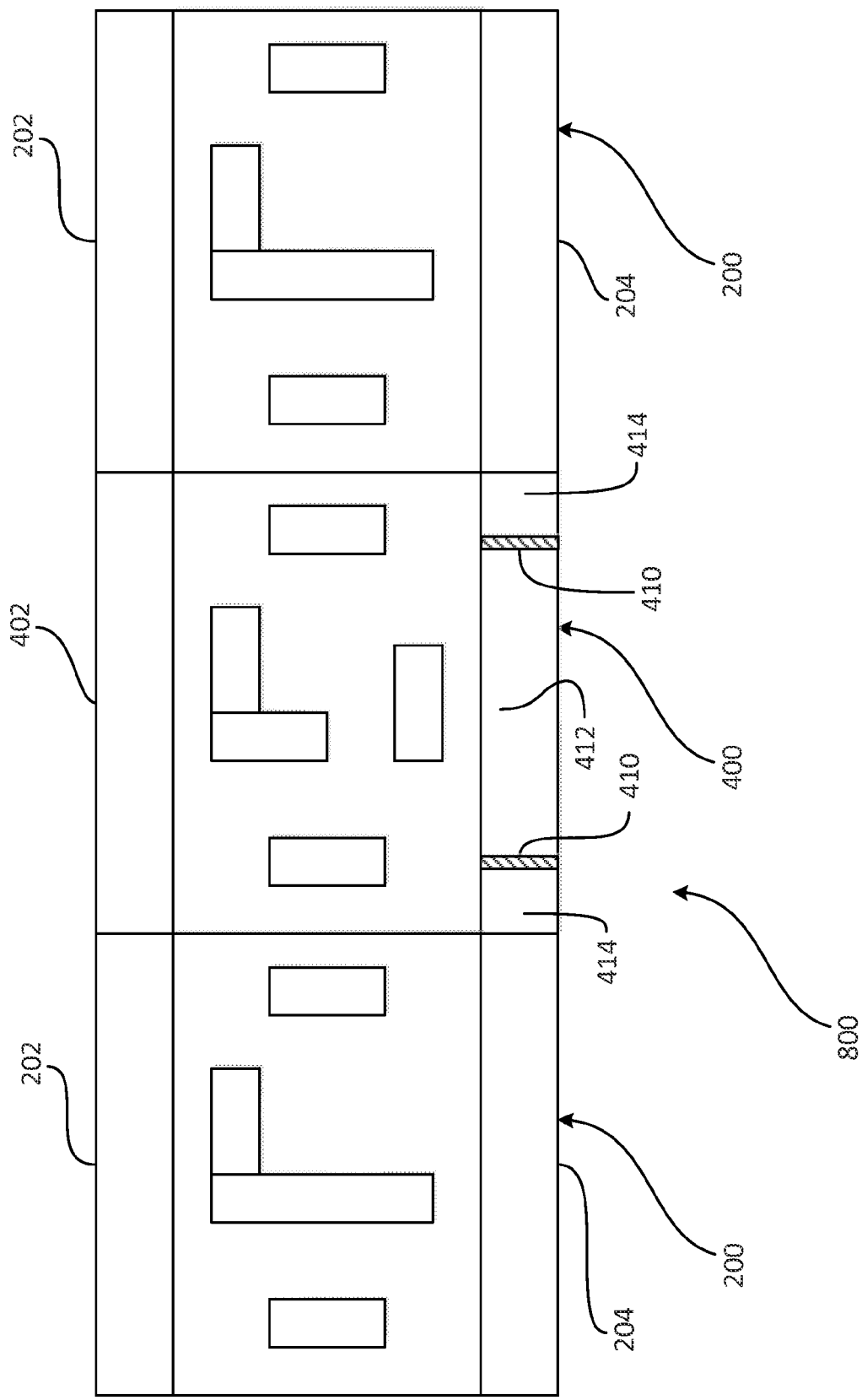
FIG. 8 demonstrates an odd path cell horizontally abutting two even path cells.

FIG. 4 shows an odd path cell configuration 400 that permits a Vdd-Vss path having an odd number of spacings smaller than the minimum single-mask separation and allows the odd path cell 400 to abut an even path cell. Odd path cell 400 is similar to cell 300, and includes patterns 406, 407, and 402 all assigned to the first mask, and pattern 408 assigned to the second mask. Odd path cell 400 differs from even path cell 300 in the layout of Vss pattern 404. In cell 400, most of the Vss bus 404 is formed on a different mask than the Vdd bus 402. Vss pattern 404 comprises three distinct regions assigned to two masks. Regions 414 are assigned to the first mask, and the largest region 412 is assigned to the second mask. The regions are joined together using stitches 410, which are discussed in further detail below. This configuration resolves the odd path violation of FIG. 3, because Vss portion 412 and Vdd pattern 402 are now assigned to different masks, and odd path cells are permitted. Regions 414 are sufficiently distant from pattern 407 that the minimum spacing constraint is not violated. Additionally, odd path cell 400 may be arranged to abut even path cell 200, as shown in FIG. 8 and discussed in detail below.

FIG. 5 shows an additional or alternative embodiment. Cell layout 500 is an even path cell. Vss pattern 504 and patterns 506 are assigned to the first mask, and pattern 508 is assigned to a second mask. Vdd pattern 502 is distributed between both the first mask and the second mask. Specifically, Vdd pattern region 512 is assigned to the first mask, and regions 510 are assigned to the second mask. Stitches 514 connect the regions of Vdd pattern 502. This embodiment demonstrates that the splitting of a bus pattern between two masks, as discussed in reference to FIG. 4, may also be applied to even path cells and/or Vdd patterns.

Figure 7:
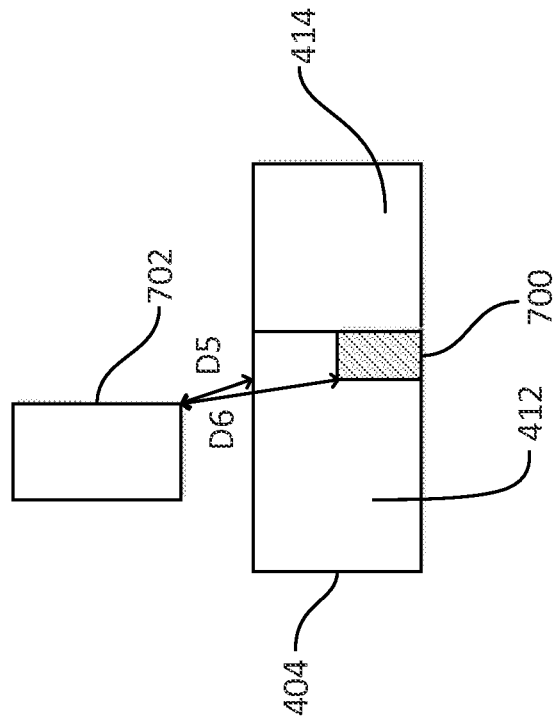
FIG. 7 is a blown up view of a pattern containing a partial overlap stitch.
Figure 6:
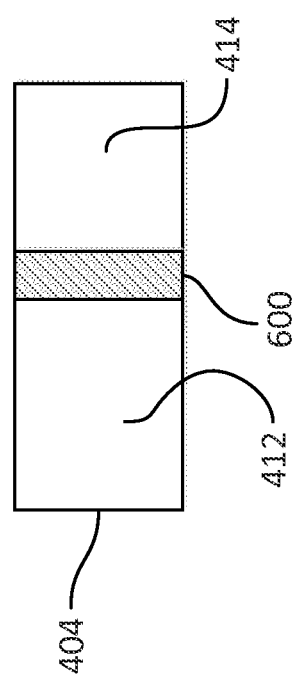
FIG. 6 is a blown up view of a pattern containing a full overlap stitch.

FIGS. 6 and 7 are enlarged detail from FIG. 4, and illustrate how a pattern may be stitched together. Vss pattern 404 comprises a first region 414 assigned to the first mask and a second region 412 assigned to the second mask. These regions are joined, or stitched, together using stitches 600 or 700. Stitches 600 and 700 are overlap regions where portions of the pattern are assigned to both the first mask and the second mask. For example, the region defined by stitch 600 or 700 is patterned onto a substrate during the lithography process by two or more masks. After a photoresist is exposed twice, successively using each respective mask, Vss pattern 404 may leave a single, continuous Vss line on the substrate.

FIG. 7 demonstrates an alternative design for the region 600, using a partial overlap stitch 700. A stitch region is provided where an overlap portion of the common pattern assigned to the first mask overlaps with an overlap portion of the common pattern assigned to the second mask, and the overlap portion of the first mask extends only partially across a width of the common pattern. Rather than overlapping Vss portions on both masks across the entire width of the Vss pattern, as shown in FIG. 6, stitch 700 creates an overlap only at a lower portion of the pattern. This configuration may allow a pattern, such as pattern 702 assigned to the first mask, to be placed closer to Vss 402 without violating any spacing rules. Since the stitches are formed by both the first and second masks, spacing violations could occur if any pattern is too close to the overlap region of the stitch, regardless of that pattern's assigned mask. A partial overlap mitigates this situation. For example, pattern 702 would be a distance D5 from the nearest corner of the overlap region, if the height of the overlap region were the full width of the Vss bus 404. Because the overlap region of stitch 700 is only a fraction of the width of the Vss bus 404, the distance D6 from pattern 702 to the nearest corner of the overlap region 700 is greater. While FIG. 7 shows the stitch located on the bottom of the Vss pattern, it may alternatively be positioned at the top of a Vdd pattern (where Vdd is at the top of the cell, and the stitch is in the Vdd bus). In other embodiments, the stitch may be located at an intermediate location between the top and bottom of one of the bus patterns.

FIG. 8 depicts an assembly 800 having a plurality of horizontally abutting even and odd path cells. Odd path cell 400 is placed in an IC layout to horizontally abut even path cells 200. Vdd patterns 202 and 402 are all assigned to the same mask. Similarly, Vss regions 204 and 414 are assigned to the same mask. This common mask assignment may allow the even 200 and odd 400 path cells to abut each other without risking a discontinuity. Vss region 412 is stitched to regions 414 via stitches 410. As described above, the ability to insert an odd path cell adjacent to an even path cell allows greater flexibility in cell design and selection, and resolves spacing conflicts which may otherwise result between the patterns of odd path cell 402 if the entire Vdd and Vss buses 402, 404 thereof were formed by a single photomask. Multiple even and/or odd path cells may be abutted in this manner to form a DPT compliant IC layout.

Figure 9:
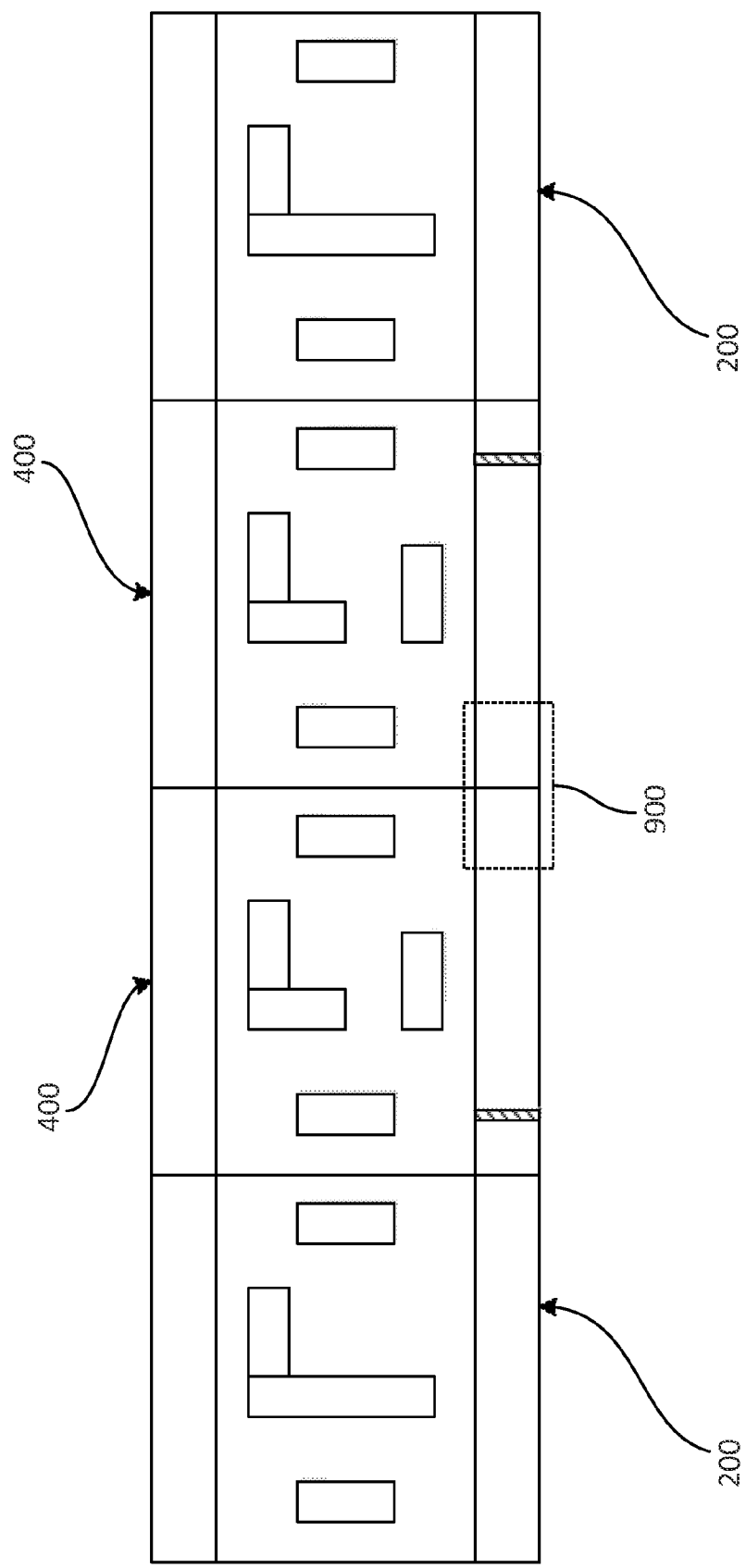
FIG. 9 depicts a series of horizontally abutting even and odd path cells, where some of the stitches in the odd path cells have been canceled.

Alternatively or additionally, a given cell may horizontally abut either an even path cell or an odd path cell, as shown in FIG. 9. This figure shows odd path cells 400 horizontally abutting each other and even path cells 200. Similar to FIG. 8, the Vdd patterns are entirely assigned to a first mask and Vss line is split between a first and a second mask. One additional feature depicted in FIG. 9 is stitch cancelling.

FIG. 9 demonstrates a further feature called stitch cancelation. As discussed in reference to FIG. 7, stitches may introduce spacing issues for nearby patterns on either mask, because the stitches are assigned to both masks. Additionally, a misaligned stitch may introduce a discontinuity in the stitched Vdd or Vss bus following the lithography process. Minimizing the number of stitches therefore minimizes the potential design risks. In the odd path cell 400 of FIG. 4, the Vss line contained two stitches 410. The first stitch transitioned the Vss pattern from the first mask to the second mask, and the second stitch transitioned the Vss pattern from the second mask back to the first mask. Region 900 identifies an area where two of these stitches are redundant, and have therefore been cancelled. In this region 900, there is no need to stitch the Vss line because the stitches will not resolve any spacing or alignment issues. In fact, removing the stitches may permit patterns to be located closer to region 900 of the Vss bus 404 (and also serve to reduce the risk that a spacing violation or disconnect will be introduced by a change in the cell layout).

The first and second odd-path cells 400 are arranged horizontally so as to abut each other. Layouts of the first and second odd-path cells 400 have a respective stitch in a power or ground rail 200 near a respective first corner of the first cell and second corner of the second cell where the first and second odd-path cells abut each other. A respective stitch is removed from each of the first and second cells in the abutting corners in region 900, so that the power or ground rails 200 in the first and second corners are to be formed in the same photomask as each other. The first odd-path cell has a third (left) corner opposite the first corner (opposite region 900) and the second odd-path cell has a fourth (right) corner opposite the second corner. The power or ground rail 200 of the first odd-path cell has a stitch near the third corner before and after the removing, and the power or ground rail of the second odd-path cell having a stitch near the fourth corner before and after the removing. Thus, the number of stitches in the power or ground rail 200 for each cell is reduced from 2 to 1.

Figure 10:
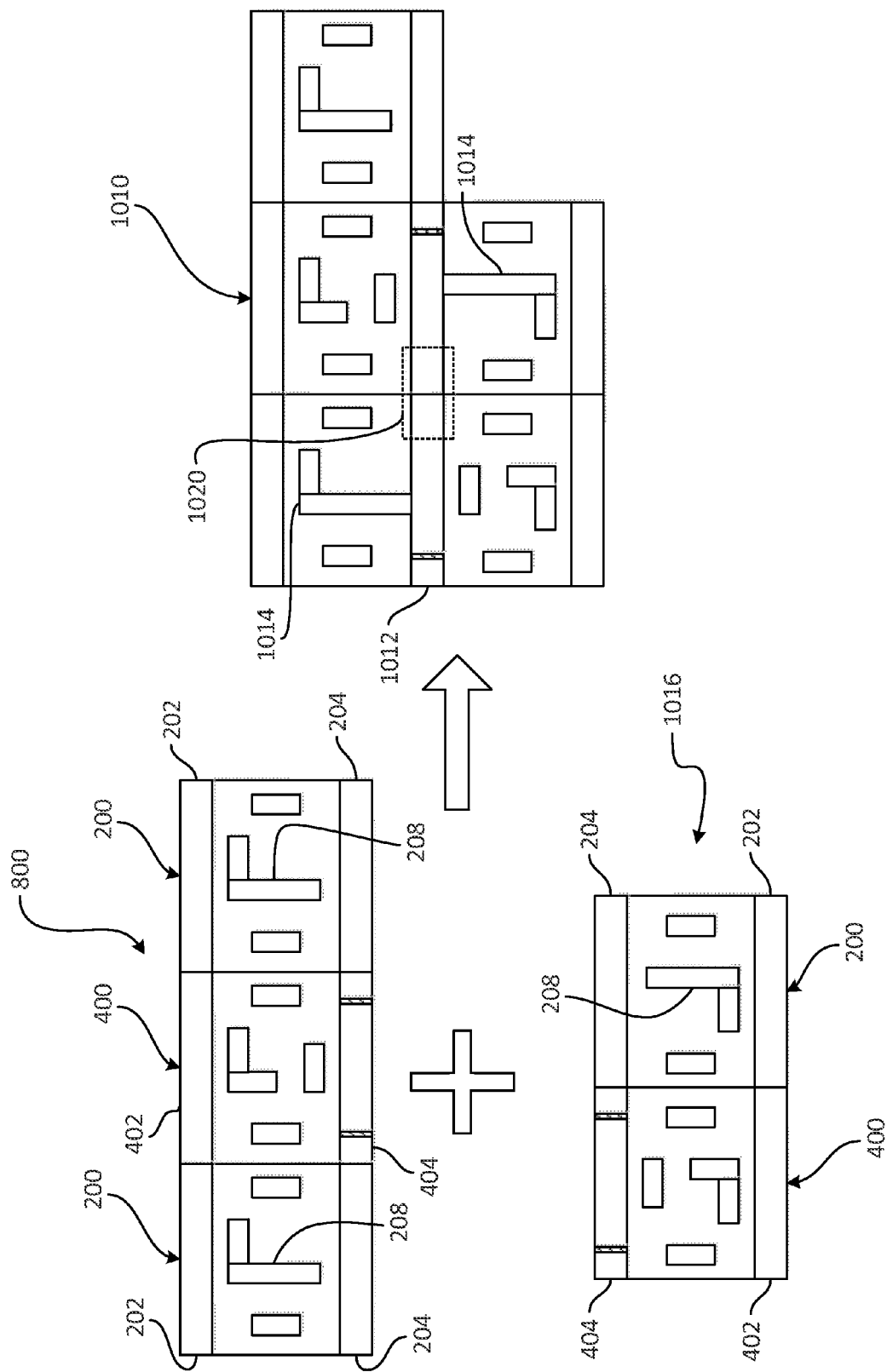
FIG. 10 depicts a merge between two horizontal cell configurations, the merge resulting in a new cell configuration with both horizontally and vertically abutting cells.

FIG. 10 demonstrates a further embodiment of the present disclosure in which one or more sets of horizontally abutting cells may be merged to vertically abut one another. Three cell configurations are shown. The first configuration 800 is a row of three horizontally abutting cells, such as cell configuration 800 depicted in FIG. 8. This first cell configuration comprises even path cells 200 and odd path cell 400. The second cell configuration contains two horizontally abutting cells 200 and 400. In this second configuration 1016, cells 400 and 200 are rotated 180 degrees relative to their orientations in FIGS. 2 and 4, so that their Vss patterns 204 and 404 may be merged with the Vss patterns 204 and 404 in the first configuration. The third configuration 1010 is the result of a merge between the first and second cell configurations. This merge provides a plurality of cells which both horizontally and vertically abut one another.

Cell configuration 1010 may comprise a common Vss bus 1012. In this pattern redundant stitches may be cancelled as discussed in reference to FIG. 9. That is, the first mask portions within the region 1020 are replaced by second mask portions, so that a continuous region is formed by the second mask on both sides of the abutment. Replacing first mask portions with second mask portions along the common Vss bus 1012 may, however, introduce minimum spacing issues. For example, pattern 208 may be less than the minimum single-mask spacing from regions of common Vss bus 1012 that are assigned to the same mask. To resolve this issue, a post process material removal or "pattern trim" procedure may be performed.

Figure 11:
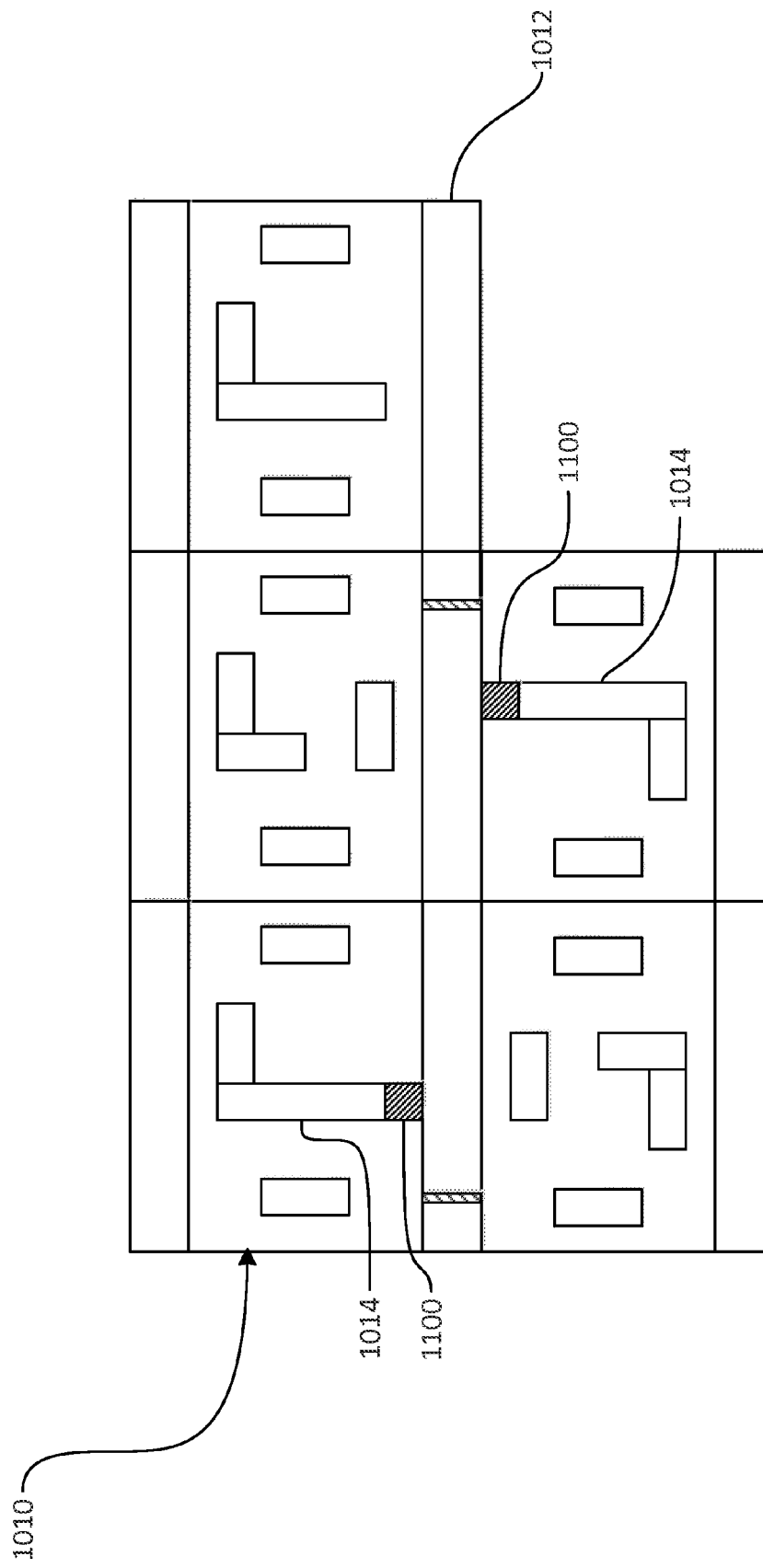
FIG. 11 identifies a region of the merged cells of FIG. 10 that is to be removed using a post process pattern trim procedure.

FIG. 11 shows an example of the pattern trim procedure. To perform the pattern trim procedure, IC design pattern 208 may be extended to, and merged with, Vss bus 1012. As a result, each of these independent patterns is assigned to the same mask as though it were a single pattern 1014. As depicted in FIG. 11, the system may then identify a region 1100 to be removed using the pattern trim procedure (this region 1100 is the same as the region that was added to merge the pattern 208 with the Vss bus 1012). After the substrate has been patterned, the pattern trim process may remove conductive material from the substrate within region 1100 to produce the cell layout depicted in FIG. 12.

In some embodiments, one of the two patterns to be merged is either the power (Vdd) bus or the ground (Vss) bus. In other embodiments, neither of the two patterns to be merged is the Vdd bus nor the Vss bus. Thus, the patterns to be merged by be located in a back end of line interconnect layer (e.g., metal layer) or in a front end of line layer (e.g., gate electrode layer).

In some embodiments, the removed material is gate conductive layer material (e.g., polysilicon or high-K metal gate material in the gate electrode layer). In other embodiments, the removed material is metal in an interconnect line layer of the IC. In some embodiments, the material removal may be performed by using an additional "trim mask" to perform a dry etch, laser or e-beam treatment to remove the material from the region 1100. In other embodiments, the material removal may be performed by a mechanical process. As used herein, the term "pattern trim" refers to any of these material removal methods after the merger of two patterns, and is neither limited to patterns that are metal, nor limited to material removal by mechanical means.

In an embodiment, the design rules may prohibit cell merges from introducing spacing issues that are resolved using a pattern trim procedure. An example of such a rule is depicted in FIG. 13.

Figure 13:
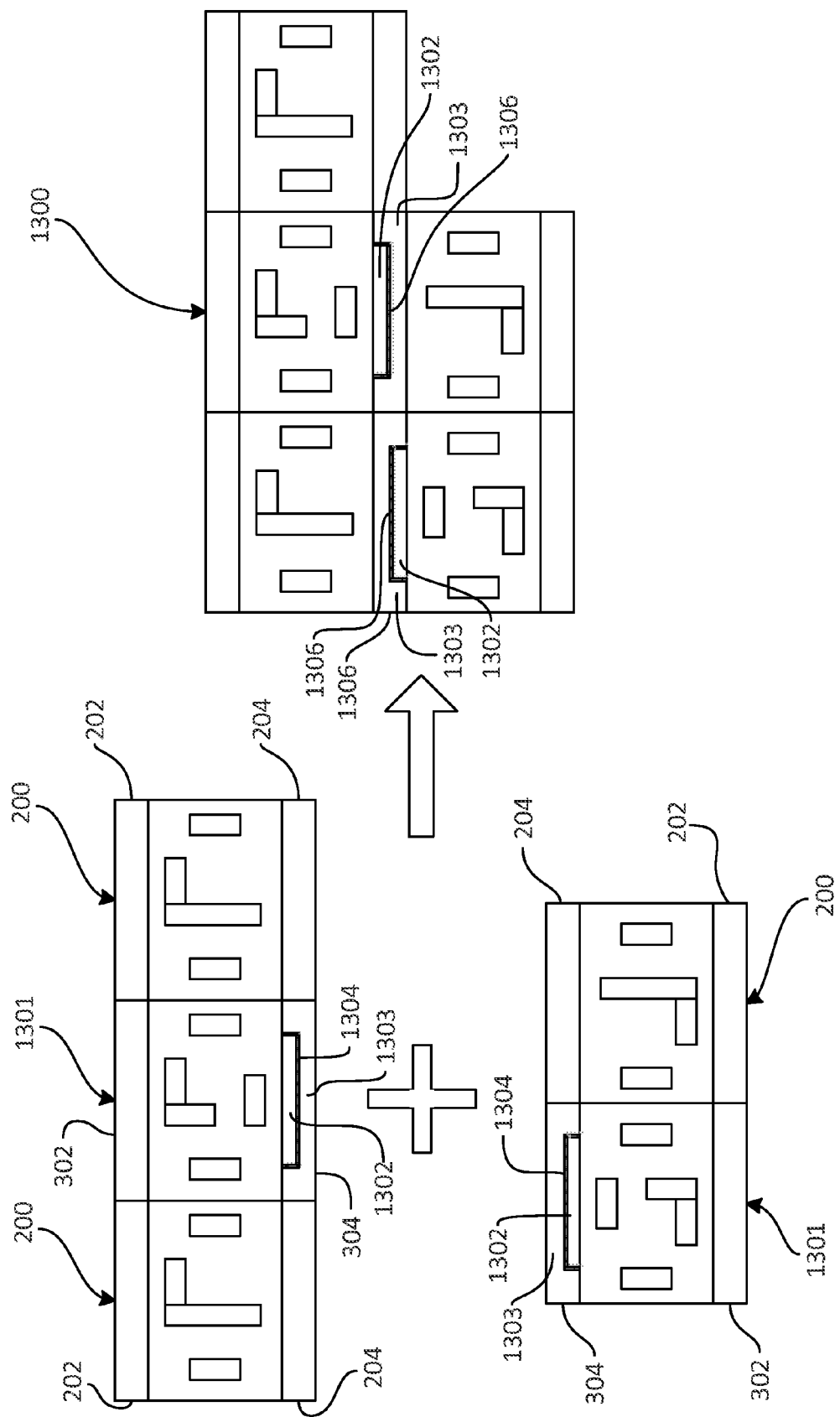
FIG. 13 demonstrates merging cells with horizontal stitches in to avoid performing a pattern trim procedure.

FIG. 13 illustrates vertically abutting cells which do not introduce a pattern spacing issue. Even and odd path cells are oriented in a manner substantially similar to the first and second cell configurations in FIG. 10. Vss lines 304 of odd path cell 1301, however, contain an additional or alternative feature. Specifically, in the odd path cells 1301, Vss lines 304 contain regions 1302 which are approximately half the width of the Vss bus, assigned to the second mask, and arranged longitudinally parallel to and abutting another portion 1303 of the Vss bus which is also half the width of the Vss bus, and assigned to the first mask. The adjacent longitudinal edges of portions 1302 and 1303 are joined using horizontal stitch 1304. This stitch is formed by an overlapped region substantially similar to the stitches discussed above, and may prevent spacing issues when merged into vertical cell configuration 1300. The ends of pattern 1302 are also stitched in the manner described above. After the merge, common Vss line 1306 includes the stitch, thereby preventing the spacing issue without using the pattern trim procedure.

Figure 14:
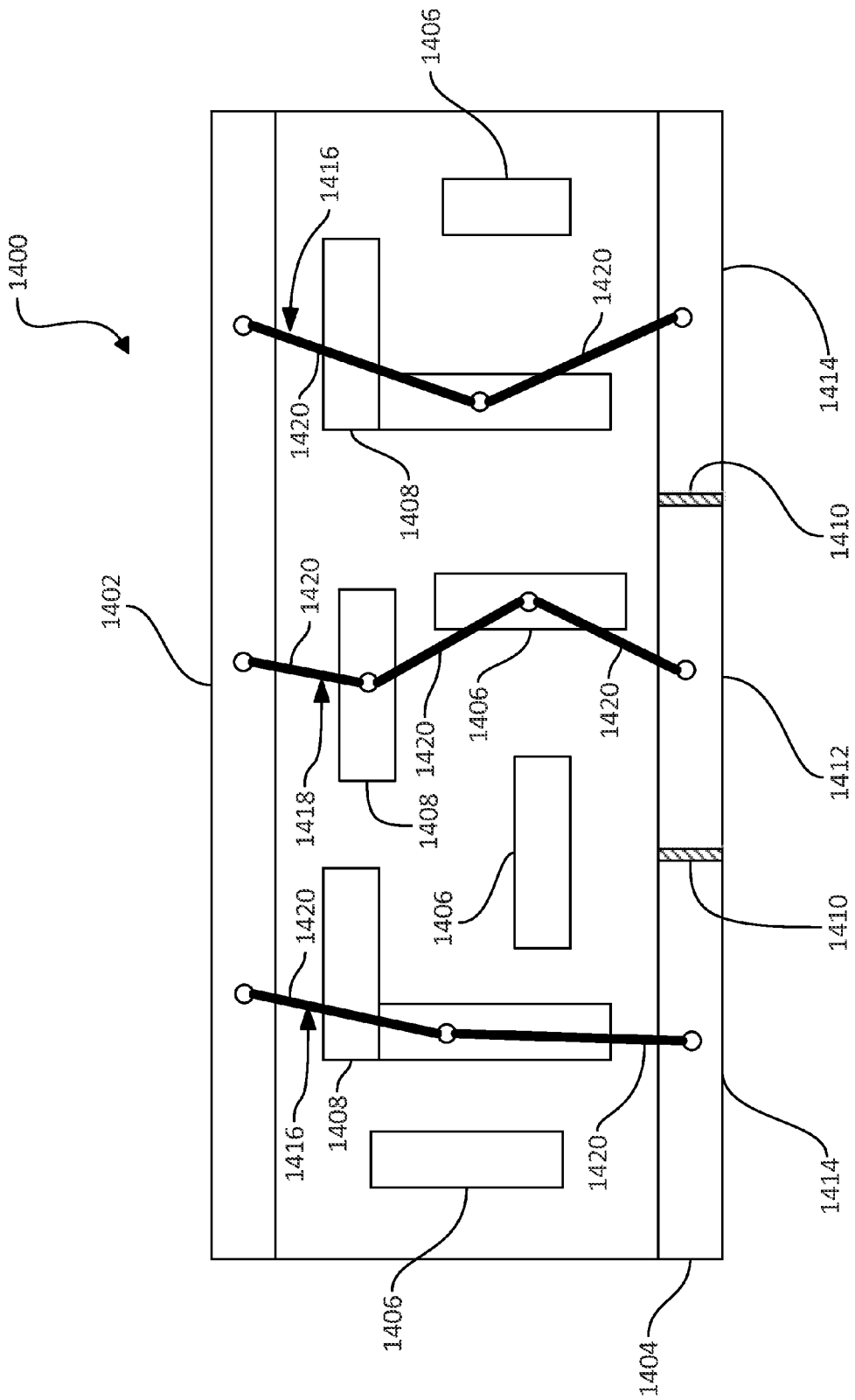
FIG. 14 depicts a large mixed path cell with two vertical stitches on the Vss pattern.
Figure 15:
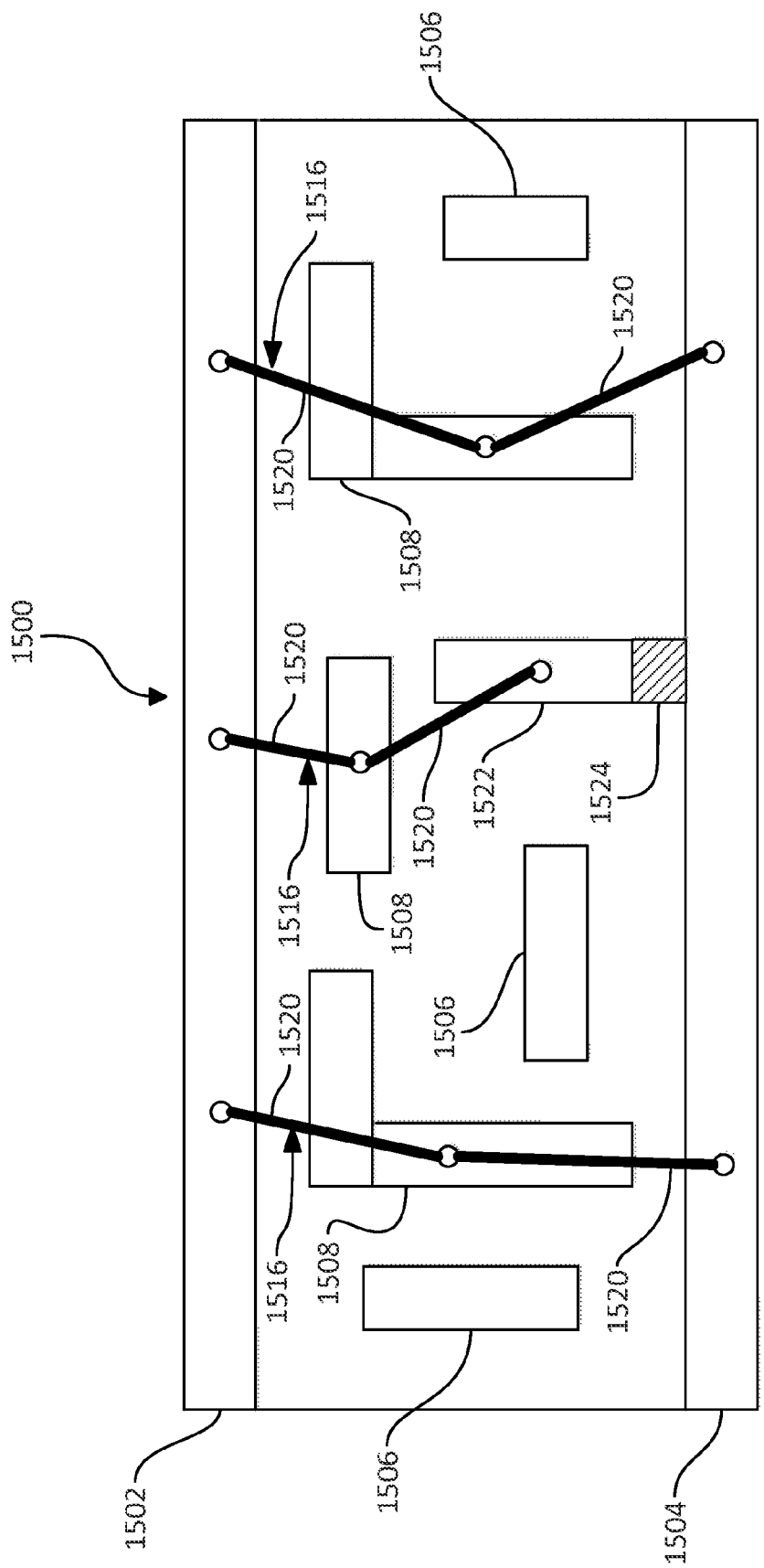
FIG. 15 depicts a large even path cell which will be subjected to a post process pattern trim procedure to produce a large mixed path cell.
Figure 16:
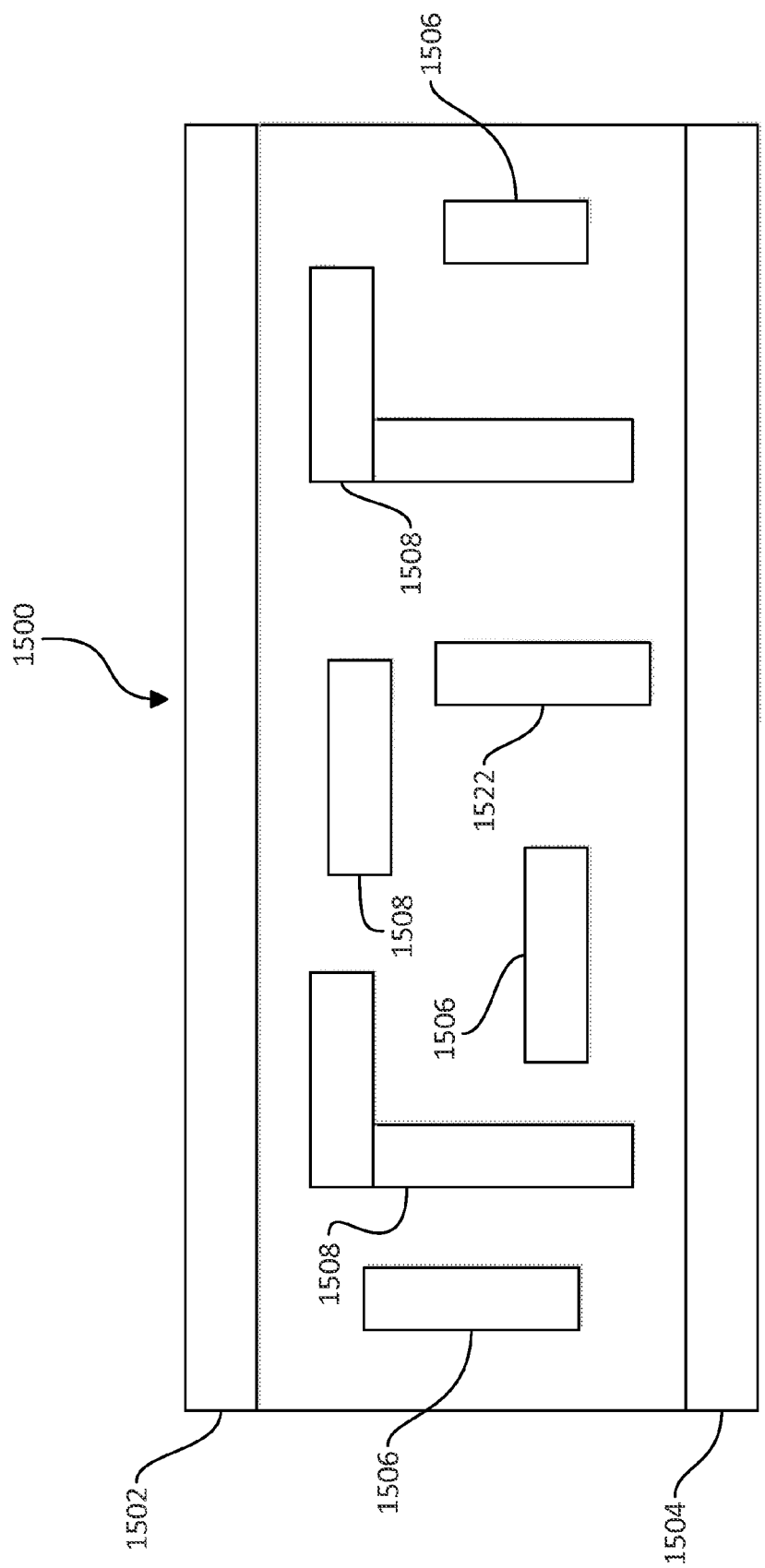
FIG. 16 shows the cell of FIG. 15 after the pattern trim procedure has been performed.

Turning now to FIGS. 14-16, an alternative use for the disclosed stitching and pattern trim methods is discussed.

FIG. 14 depicts a large, mixed path cell 1400. Mixed path cell 1400 comprises patterns 1406 assigned to a first mask, and patterns 1408 assigned to a second mask. Vdd pattern 1402 is assigned to the first mask, and Vss pattern 1404 comprises regions 1414 on the first mask and region 1412 on the second mask. Regions 1412 and 1414 are joined using stitches 1410 as discussed above. Cell 1400 is designated as a mixed path cell because the Vss bus has respective portions formed using the respective first and second masks, located in respective portions of the cell having respective even paths 1416 and odd path 1418. Both paths comprise segments 1420 which identify spaces between the patterns that may be smaller than the minimum single-mask spacing constraint. Even paths 1416 have an even number of segments 1420, and therefore identifies an even number of spaces smaller than the minimum single-mask spacing, while odd path 1418 has an odd number of segments, and therefore identifies an odd number of spaces smaller than the minimum single-mask spacing (an odd path from Vdd to Vss). This embodiment demonstrates how stitching may create mixed path cells that would otherwise violate the even path cell design rules if the Vdd bus 1402 is formed entirely by the first mask and the Vss bus is formed entirely by the first mask or entirely by the second mask.

FIGS. 15 and 16 depict a means for using the pattern trim method for creating a large mixed path cell. Mixed path cell 1500 contains Vdd pattern 1502, Vss pattern 1504, region 1524, and patterns 1506, 1522 all assigned to the first mask. Cell 1500 also contains patterns 1508 assigned to the second mask. Prior to performing the cut procedure, cell 1500 is essentially patterned as an even path cell. Pattern 1522, region 1524, and Vss pattern 1504 are all assigned to the same mask and are therefore considered to be the same pattern. As a result, even paths 1516 have an even number of segments 1520 spanning an even number of spaces. After the substrate has been patterned, a pattern trim procedure may be performed. This procedure removes material from the substrate in region 1524 to produce the cell layout depicted in FIG. 16. Because the masks have already been applied, the spacing between pattern 1522 and the Vss bus 1504 is not limited by the minimum single-mask spacing for the patterning step. This process allows pattern 1522 and Vss pattern 1504 to be placed close to each other without using the stitching methods discussed above. Essentially, an odd path can be treated as an even path during double patterning decomposition, so that the mixed path cell can be handled like an even path cell. Similarly, if a mixed path cell predominantly has odd paths, an even path can be treated as an odd path during double patterning decomposition by merging a pattern of the even path with a Vdd or Vss bus, so that the mixed path cell can be handled like an odd path cell.

Figure 17:
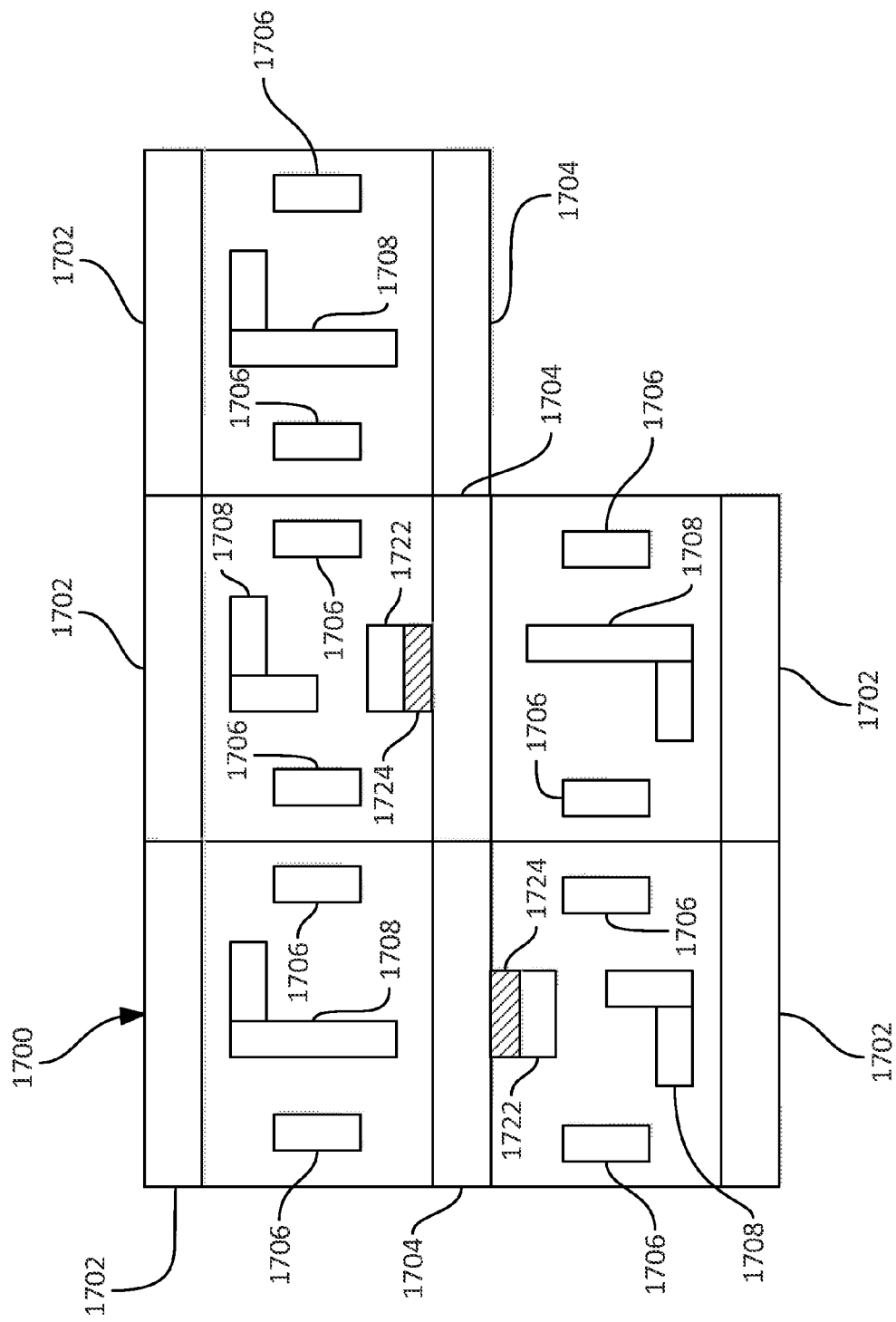
FIG. 17 depicts a series of horizontally and vertically abutting cells the will be subjected to a pattern trim procedure.
Figure 18:
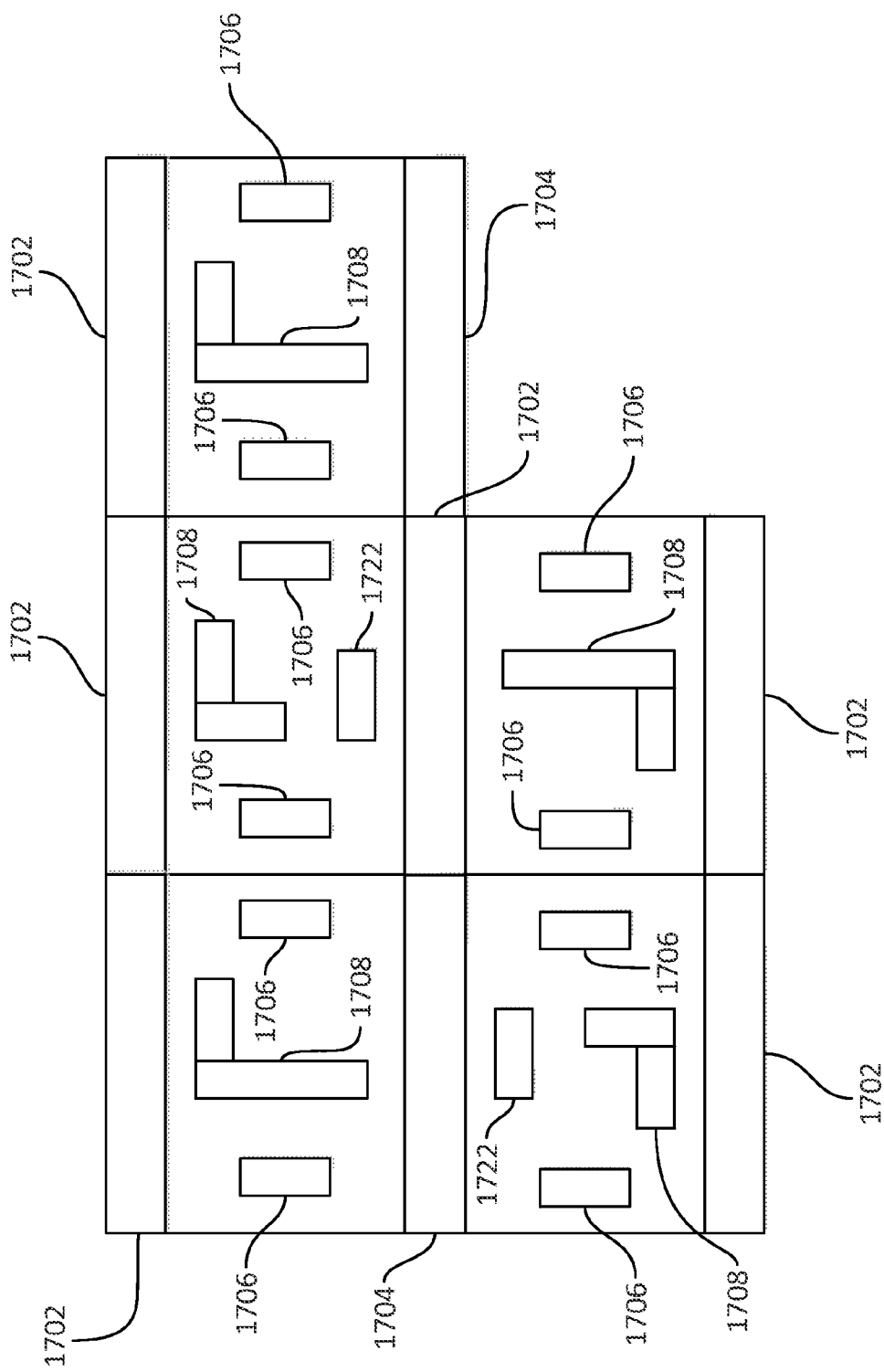
FIG. 18 depicts the series of horizontally and vertically abutting cells of FIG. 17 after they have been trimmed.

As shown in FIGS. 17-18, pattern trim techniques may also be used as an alternative to stitching in horizontal and vertical abutting cells. Cell configuration 1700 comprises a plurality of cells having patterns 1706 assigned to a first mask and 1708 assigned to a second mask. The cells also comprise Vdd buses 1702, Vss buses 1704, regions 1724, and patterns 1722 all assigned to the first mask. There are no spacing rule violations because patterns 1722, 1724, and 1704 are connected and assigned to the same mask. These patterns therefore form a single pattern on the produced mask. Once the substrate has been patterned during the lithography process, a pattern trim may be performed to remove material from region 1724 to produce the final IC layout depicted in FIG. 18.

Figure 12:
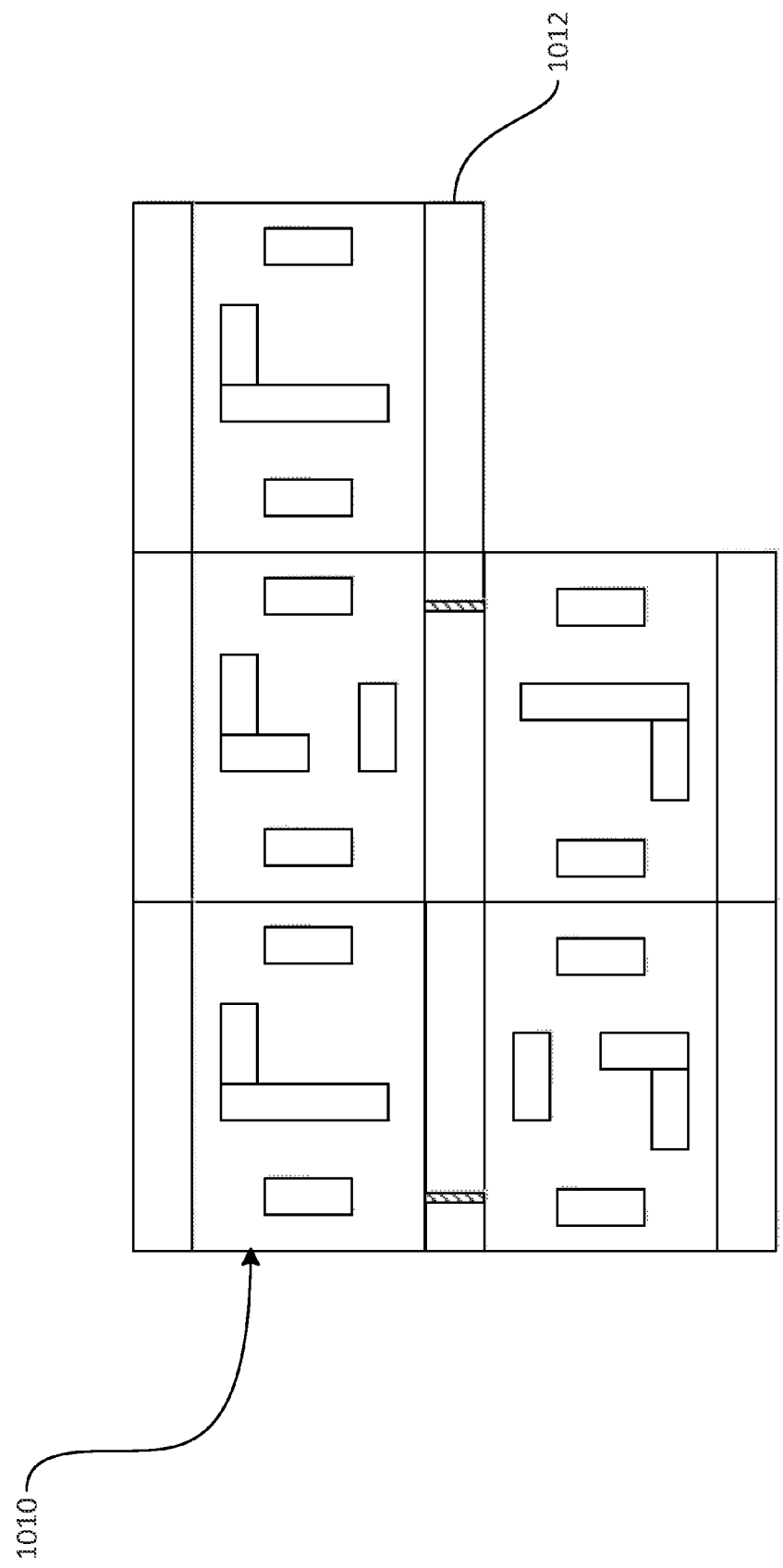
FIG. 12 depicts the merged cells of FIG. 10 after the pattern trim procedure has been performed.
Figure 19:
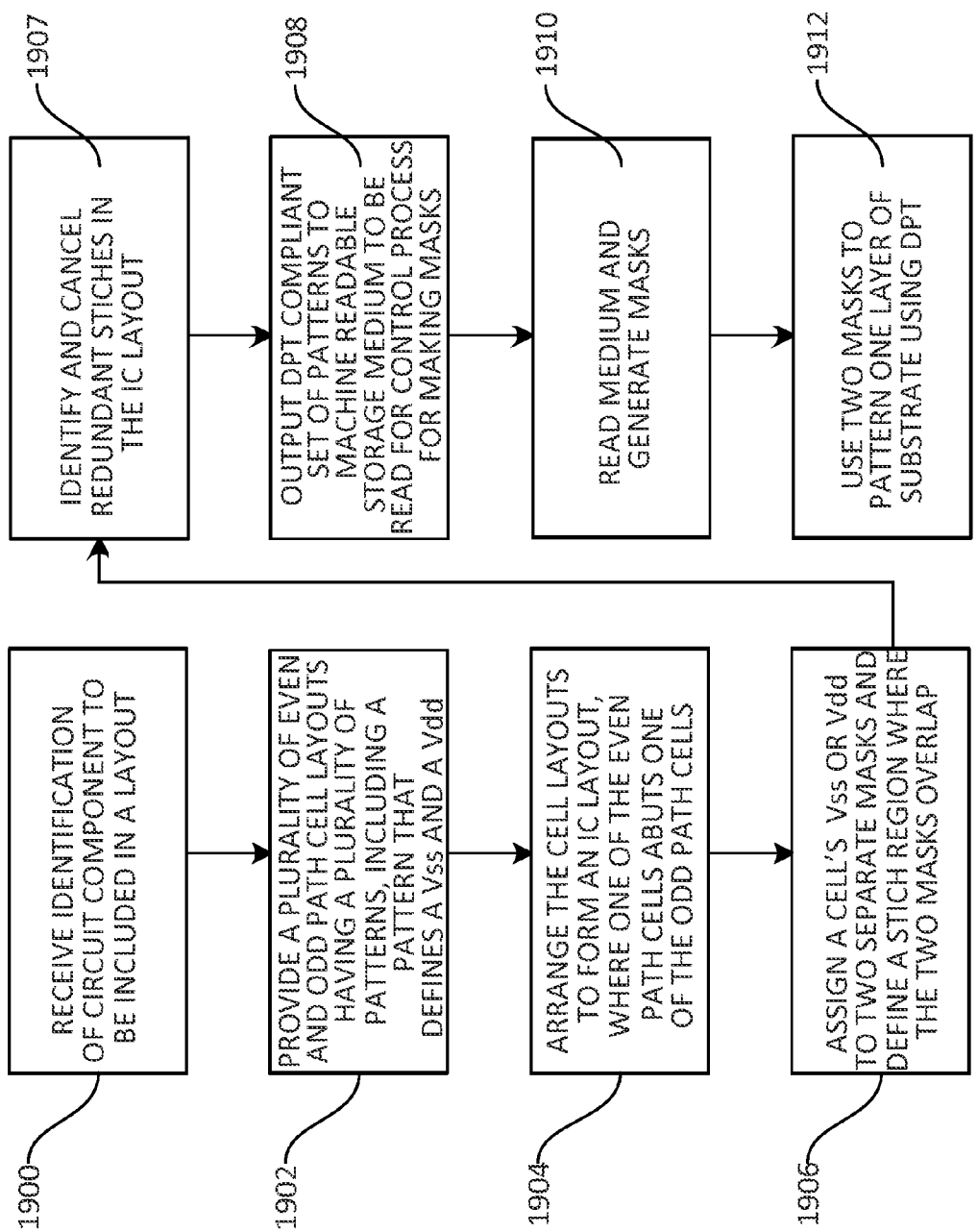
FIG. 19 is a detailed flowchart for forming an IC layout using the disclosed stitching practices.

FIG. 19 is a detailed flowchart for a method of forming an IC layout comprising horizontally and vertically abutting even and odd path cells with stitches along the Vss or Vdd lines, such as the layout depicted in FIG. 12.

At step 1900, the system receives identification of a plurality of circuit components to be included in an IC layout.

At step 1902, the system provides a plurality of even or odd path cell layouts that include a plurality of patterns. These cell layouts may include patterns for a Vss bus and a Vdd bus. Additionally, the cell layouts may be decomposable by double patterning techniques.

At step 1904, the cells may be horizontally or vertically abutted to one another. When the cells are horizontally abutted, they may produce cell layouts similar to those depicted in FIGS. 8 and 9. Vertically abutting cells may produce layouts similar to those shown in FIGS. 10-13, 17, and 18. The vertically abutting cells may share a common Vdd or Vss pattern, or may retain their own Vdd and Vss patterns.

At step 1906, a cell's Vss or Vdd patterns may be assigned to two separate masks. These patterns may include a stitch region which is assigned to both masks, such as the stitch region displayed in FIGS. 6 and 7. Redundant stitches may be cancelled to limit the risk of minimum spacing issues, as demonstrated by FIG. 9. Additionally, the stitches may be configured to extend in a horizontal direction, as shown in FIG. 13.

At step 1907, the system identifies areas having redundant stitches. If any such stitches are found, they may be cancelled as demonstrated by FIG. 9.

At step 1908 the system outputs the data representing double-patterning compliant set of patterns to a machine readable storage medium to be read by a system for controlling a process to fabricate a pair of masks for patterning a semiconductor substrate using double patterning technology.

At step 1910, a mask generating tool reads the data representing the double-patterning compliant set of patterns from the machine readable storage medium, and forms a set of masks suitable for double patterning.

At step 1912, two masks are used to pattern the same semiconductor substrate using double patterning technology.

Figure 20:
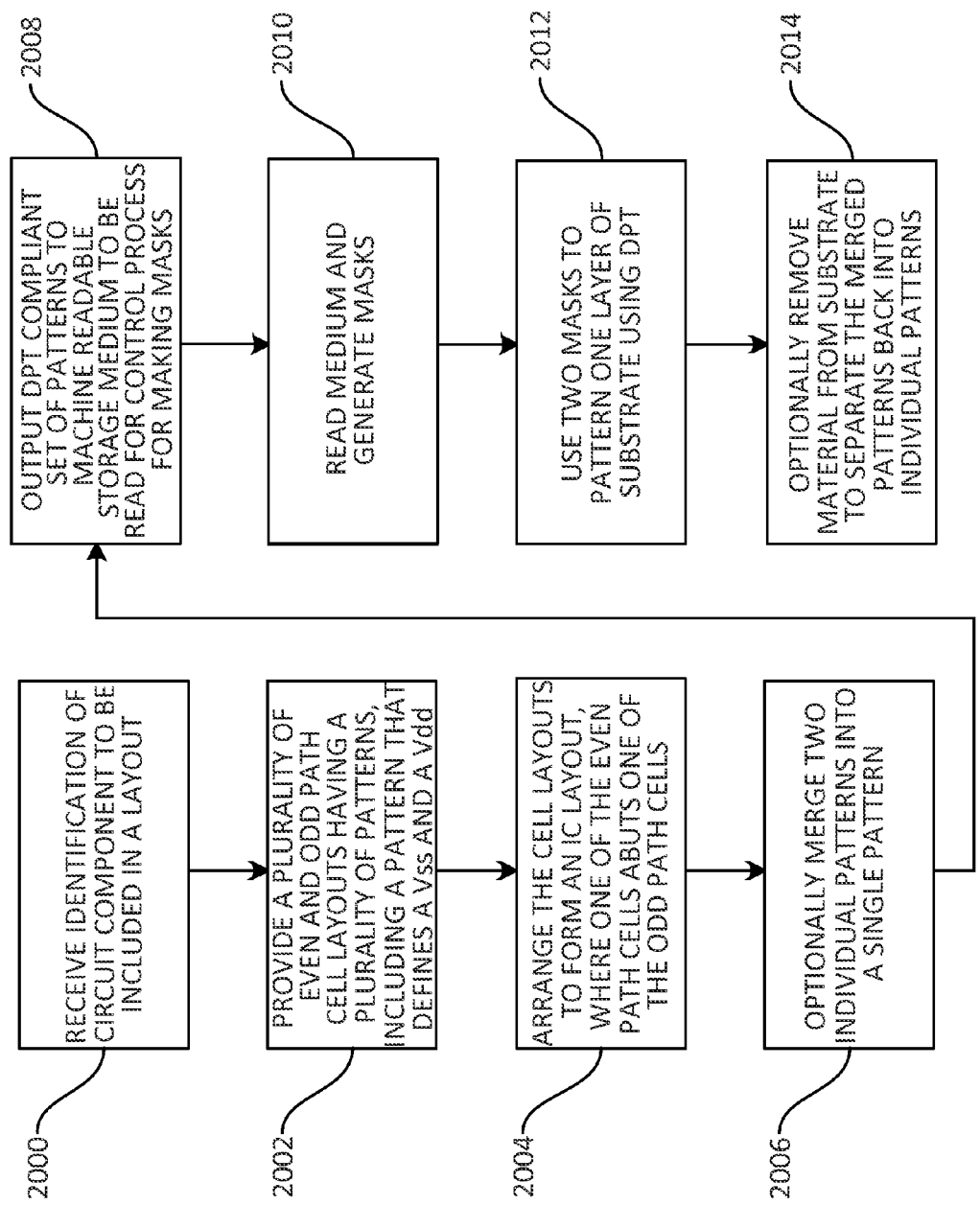
FIG. 20 is a detailed flowchart for forming an IC layout using the disclosed trimming practices.

FIG. 20 is a detailed flowchart for a method of forming an IC layout comprising horizontally and vertically abutting even and odd path cells using the pattern trim techniques.

At step 2000, the system receives identification of a plurality of circuit components to be included in an IC layout.

At step 2002, the system provides a plurality of even or odd path cell layouts that include a plurality of patterns. These cell layouts may include patterns for a Vss bus and a Vdd bus. Additionally, the cell layouts may be decomposable by double patterning techniques.

At step 2004, the cells may be horizontally or vertically abutted to one another. When the cells are horizontally and vertically abutted, they may produce cell layouts similar to those depicted in FIGS. 17 and 18. Vertically abutting cells may share a common Vdd or Vss pattern, or may retain their own Vdd and Vss patterns.

At step 2006, vertically abutting cells which introduce an even-path rule violation or odd path rule violation are identified. Patterns that are closer together than the minimum single-mask spacing can be merged into a single pattern by filling the intervening space. Subsequently, the added portion of the pattern can be removed at step 2014 after the masks have been applied to the substrate.

At step 2008 the system outputs the data representing double-patterning compliant set of patterns to a machine readable storage medium to be read by a system for controlling a process to fabricate a pair of masks for patterning a semiconductor substrate using double patterning technology.

At step 2010, a mask generating tool reads the data representing the double-patterning compliant set of patterns from the machine readable storage medium, and forms a set of masks suitable for double patterning.

At step 2012, two masks are used to pattern the same semiconductor substrate using double patterning technology.

At step 2014, if the pattern trim option is used, material is removed from the substrate to separate a merged pattern back into the two original patterns that were present in the circuit design before the patterns were merged. In some embodiments, the removed material is metal in the interconnect line layer of the IC.

The subject matter described herein can be embodied in the form of methods and apparatus for practicing those methods. The subject matter can also be embodied in the form of program code embodied in tangible persistent storage media, such as flash memory, CD-ROMs, DVD-ROMs, Blu-ray disks, hard drives, or any other machine-readable storage medium, wherein, when the program code is loaded into and executed by a machine, such as a computer, the machine becomes an apparatus for practicing the method. The subject matter can also be embodied in the form of program code, loaded into and/or executed by a machine, when the program code is loaded into and executed by a machine, such as a computer or embedded processor, the machine becomes an apparatus for performing the method. When implemented on a general-purpose processor, the program code segments combine with the processor to provide a unique device that operates analogously to specific logic circuits. In alternative embodiments, the subject matter may be embodied in application specific integrated circuits for performing the method.

Although the subject matter has been described in terms of exemplary embodiments, it is not limited thereto. Rather, the appended claims should be construed broadly, to include other variants and embodiments, which may be made by those skilled in the art without departing from the scope and range of equivalents of the disclosure.

What is claimed is:
1. A method, comprising:
providing a non-transitory machine readable storage medium encoded with data representing a cell layout having patterns including a bus pattern, wherein the patterns of the cell layout are assigned into respective sets to be patterned using at least a first mask and a second mask for patterning a single layer of an IC;

assigning a first portion of the bus pattern to be patterned by the first mask and a second portion of the bus pattern to be patterned by the second mask;

assigning an overlap portion of the bus pattern to be patterned using the first mask and the second mask, including:

assigning a rectangular portion within the bus pattern to the second mask, and assigning a polygon within the bus pattern and surrounding the rectangle on three sides to the first mask, wherein three respective sides of the rectangle overlap with respective overlap portions of the polygon; and outputting the cell layout to a machine readable storage medium to be read by a system for controlling a process to fabricate the first and second masks for patterning a semiconductor substrate using the first and second masks to pattern a single layer.

2. The method of claim 1, wherein the overlap portion of the bus pattern assigned to the second mask extends partially across the width of the bus pattern in a direction parallel to the shorter dimension of the bus.

3. The method of claim 2, wherein the overlap portion of the bus pattern assigned to the second mask abuts a second portion of the bus pattern assigned to the first mask outside of the overlap portion of the first mask.

4. The method of claim 1, wherein the cell layout has an interior region containing a circuit pattern, and the overlap portion of the first mask is positioned on a longitudinal edge of the bus pattern distal from the circuit pattern.

5. The method of claim 4, wherein the circuit pattern is positioned at a given distance from a nearest corner of the overlap region, the given distance being smaller than a spacing rule for a distance between patterns.

6. The method of claim 4, wherein the circuit pattern is assigned to the first mask.

7. The method of claim 1, wherein:

the overlap portion of the bus pattern assigned to the second mask extends partially across the width of the bus pattern in a direction parallel to the shorter dimension of the bus;

the overlap portion of the bus pattern assigned to the second mask abuts a second portion of the bus pattern assigned to the first mask outside of the overlap portion of the first mask;

the cell layout has an interior region containing a circuit pattern, the circuit pattern is assigned to the first mask, and the overlap portion of the first mask is positioned on a longitudinal edge of the bus pattern distal from the circuit pattern; and the circuit pattern is positioned at a given distance from a nearest corner of the overlap region, the given distance being smaller than a spacing rule for a distance between patterns.

8. A method, comprising:

providing a non-transitory machine readable storage medium encoded with data representing a cell layout having patterns including a bus pattern, wherein the patterns of the cell layout are assigned into respective sets to be patterned using at least a first mask and a second mask for patterning a single layer of an IC;

assigning a first portion of the bus pattern to be patterned by the first mask and a second portion of the bus pattern to be patterned by the second mask;

assigning an overlap portion of the bus pattern to be patterned by both the first mask and the second mask, including:

assigning a rectangular portion within the bus pattern to the second mask;

assigning a polygon within the bus pattern and surrounding the rectangle on three sides to the first mask, wherein three respective sides of the rectangle overlap with respective overlap portions of the polygon; and outputting the cell layout to a machine readable storage medium to be read by a system for controlling a process to fabricate the first and second masks for patterning a semiconductor substrate using the first and second masks to pattern a single layer.

9. The method of claim 8, wherein the cell layout is an odd path cell layout, having a Vdd-Vss path with an odd number of spacings smaller than a minimum single mask separation.

10. The method of claim 8, wherein:

the cell layout further comprises a second bus pattern assigned to the first mask, with an interior region of the cell layout between the bus pattern and the second bus pattern, and a portion of the bus pattern assigned to the second mask extends along an interior edge of the bus pattern abutting the interior region.

11. The method of claim 10, further comprising joining the cell layout vertically with a second cell layout, such that the bus pattern of the cell layout serves as common bus pattern for the cell layout and the second cell layout, wherein the second cell layout is an even path cell layout having an even number of spacings smaller than a minimum single mask separation distance.

12. The method of claim 11, further comprising:

joining the cell layout horizontally with a third cell layout, such that the bus pattern of the cell layout is continuous with a bus pattern of the third cell layout, and assigning the bus pattern of the third cell layout to the first mask.

13. The method of claim 12, wherein:

the cell layout is an odd path cell layout, having a Vdd-Vss path with an odd number of spacings smaller than a minimum single mask separation; and the third cell layout is an even path cell layout having an even number of spacings smaller than a minimum single mask separation distance.

14. The method of claim 10, further comprising:

joining the cell layout horizontally with a second cell layout, such that the bus pattern of the cell layout is continuous with a bus pattern of the second cell layout, and assigning the bus pattern of the second cell layout to the first mask.

15. The method of claim 8, wherein the cell layout is an odd path cell layout, having a Vdd-Vss path with an odd number of spacings smaller than a minimum single mask separation, the method further comprising:

joining the cell layout vertically with a second cell layout, such that the bus pattern of the cell layout serves as common bus pattern for the cell layout and the second cell layout, wherein the second cell layout is an even path cell layout having an even number of spacings smaller than a minimum single mask separation distance;

joining the cell layout horizontally with a third cell layout, such that the bus pattern of the cell layout is continuous with a bus pattern of the third cell layout, and assigning the bus pattern of the third cell layout to the first mask.

16. A method, comprising:

providing a non-transitory machine readable storage medium encoded with data representing a cell layout having patterns including a bus pattern, wherein the patterns of the cell layout are assigned into respective sets to be patterned using at least a first mask and a second mask for patterning a single layer of an IC;

assigning a rectangular portion within the bus pattern to the second mask;

assigning a polygon within the bus pattern and surrounding the rectangle on three sides to the first mask, wherein three respective sides of the rectangle overlap with respective overlap portions of the polygon; and outputting the cell layout to a machine readable storage medium to be read by a system for controlling a process to fabricate the first and second masks for patterning a semiconductor substrate using the first and second masks to pattern a single layer.

17. The method of claim 16, wherein the three sides of the rectangle include a fist side and two ends, the first side being longer than the two ends.

18. The method of claim 16, wherein:

the cell layout further comprises a second bus pattern assigned to the first mask, with an interior region of the cell layout between the bus pattern and the second bus pattern, and the rectangle extends along an interior edge of the bus pattern abutting the interior region.

19. The method of claim 16, wherein the cell layout is an odd path cell layout having a Vdd-Vss path with an odd number of spacings smaller than a minimum single mask separation, and the method further comprises joining the cell layout horizontally with a second cell layout, such that the bus pattern of the cell layout is continuous with a bus pattern of the second cell layout, and assigning the bus pattern of the second cell layout to the first mask.

20. The method of claim 16, further comprising joining the cell layout vertically with a second cell layout, such that the bus pattern of the cell layout serves as common bus pattern for the cell layout and the second cell layout, wherein:

the cell layout is an odd path cell layout having a Vdd-Vss path with an odd number of spacings smaller than a minimum single mask separation, and the second cell layout is an even path cell layout having an even number of spacings smaller than a minimum single mask separation distance.

* * * * *